United States Patent Office 3,715,349
Patented Feb. 6, 1973

3,715,349
17-HYDROXY-7α-MERCAPTO-3-OXO-17α-PREGN-4-
ENE-21-CARBOXYLIC ACID γ-LACTONE
Paul B. Sollman, Wilmette, Ill., assignor to
G. D. Searle & Co., Chicago, Ill.
No Drawing. Filed Sept. 30, 1971, Ser. No. 185,366
Int. Cl. C07c 173/00
U.S. Cl. 260—239.57   1 Claim

ABSTRACT OF THE DISCLOSURE

Preparation and the diuretic utility of the captioned compound are disclosed.

---

This invention relates to 17 - hydroxy-7α-mercapto-3-oxo-17α-pregn-4-ene-21-carboxylic acid γ-lactone, a new, useful, and unobvious chemical compound having the formula

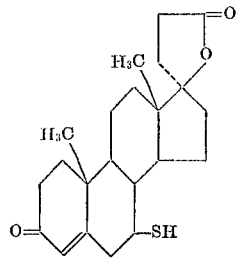

and which is characterized by valuable biological properties. For example, the aforesaid compound is a diuretic agent especially adapted to reverse the effect of desoxycorticosterone acetate (DCA) on urinary sodium and potassium. A standardized test for this property, carried out in rats as described by C. M. Kagawa in chapter 34 of volume II of D. R. Laurence and A. L. Bacharach's "Evaluation of Drug Activities: Pharmacometrics," is detailed in U.S. 3,422,096.

Those skilled in the art will recognize that observations of activity in standardized tests for particular biological effects are fundamental to the development of valuable new drug products, both veterinary and human.

17-hydroxy-7α-mercapto - 3 - oxo-17α-pregn-4-ene-21-carboxylic acid γ-lactone can be administered in any convenient manner. For example, the compound can be administered orally in the form of a tablet, capsule, solution, or suspension. Alternatively, parenteral administration will serve. Typical vehicles and/or excipients adapted to preparation of the foregoing dosage forms include water, ethanol, propylene glycol, corn oil, sesame oil, lactose, cellulose, calcium phosphate, dicalcium phosphate, tricalcium phosphate, sodium sulfate, calcium sulfate, corn starch, polyvinylpyrrolidone, acacia, methylcellulose, alkaline earth stearates such as magnesium stearate, and hydrogenated castor oil.

Biologically effective amounts of 17-hydroxy-7α-mercapto-3-oxo-17α-pregn-4-ene-21-carboxylic acid γ-lactone depend upon the purpose for which it is administered, the species involved, and individual response. Suggested daily dosages range from 0.5 to 6.0 mg./kg. orally.

Preparation of 17-hydroxy - 7α - mercapto-3-oxo-17α-pregn-4-ene-21-carboxylic acid γ-lactone proceeds by contacting 17 - hydroxy-7α-acetylthio-3-oxo-17α-pregn-4-ene-21-carboxylic acid γ-lactone with sodium methoxide in methanol.

Equivalent to 17-hydroxy - 7α - mercapto-3-oxo-17α-pregn-4-ene-21-carboxylic acid γ-lactone, for the purposes of this invention, are corresponding mercaptides (especially the sodium, potassium, and calcium mercaptides), the hydroxy acids corresponding to the aforesaid mercaptan and mercaptides, and the alkali, alkaline earth, and ammonium salts of the said hydroxy acids.

The following examples, which describe in detail the preparation and tableting of 17-hydroxy-7α-mercapto-3-oxo-17α-pregn-4-ene - 21 - carboxylic acid γ-lactone, are offered by way of illustration of, and not to delimit, the invention. It will be apparent to those skilled in the art that many modifications, both of materials and of method, may be practiced without departing from the purpose and intent of this disclosure. In both examples, relative amounts of materials are expressed as parts by weight except as otherwise noted.

EXAMPLE 1

Preparation of 17-hydroxy - 7α - mercapto-3-oxo-17α-pregn-4-ene-21-carboxylic acid γ-lactone.—To a solution of 59 parts of 17-hydroxy-7α-acetylthio-3-oxo-17α-pregn-4-ene-21-carboxylic acid γ-lactone in 640 parts of methanol under nitrogen is added, with agitation, a solution of 11 parts of sodium methoxide in 160 parts of methanol. Agitation under nitrogen is continued for 15 minutes, whereupon the reaction mixture is neutralized with acetic acid and then diluted with approximately 2 volumes of water. The precipitate thrown down is 17-hydroxy-7α-mercapto-3-oxo-17α-pregn-4-ene-21-carboxylic acid γ-lactone which, recrystallized from aqueous methanol, melts at around 195–197°.

EXAMPLE 2

Tableting of 17-hydroxy-7α-mercapto-3-oxo-17α-pregn-4-ene-21-carboxylic acid γ-lactone.—A mixture of 250 parts of 17-hydroxy-7α-mercapto-3-oxo-17α-pregn-4-ene-21-carboxylic acid γ-lactone, 1700 parts of calcium sulfate dihydrate, 532 parts of corn starch, and 80 parts of polyvinylpyrrolidone is screened, remixed, and then moistened with water. The resultant mixture is screened, remixed again, and granulated with cold water, then screened again, dried, and finally screened once more. Approximately 13 parts of magnesium stearate is thereupon introduced, and the mixture thus obtained is thoroughly blended, assayed, and compressed into 20-mg. tablets.

What is claimed is:
1. 17-hydroxy-7α-mercapto - 3 - oxo-17α-pregn-4-ene-21-carboxylic acid γ-lactone.

References Cited

UNITED STATES PATENTS

| | | | |
|---|---|---|---|
| 3,013,012 | 12/1961 | Cella et al. | 260—239.57 |
| 3,254,074 | 5/1966 | Arth et al. | 260—239.55 |
| 3,422,096 | 1/1969 | Brown | 260—239.55 |
| 3,509,136 | 4/1970 | Brown | 260—239.57 |

HENRY A. FRENCH, Primary Examiner

U.S. Cl. X.R.

260—999